(12) United States Patent
Han et al.

(10) Patent No.: US 12,197,002 B2
(45) Date of Patent: Jan. 14, 2025

(54) HETEROGENEOUSLY INTEGRATED OPTICAL MODULATOR AND MANUFACTURING METHOD THEREOF

(71) Applicant: ELECTRONICS AND TELECOMMUNICATIONS RESEARCH INSTITUTE, Daejeon (KR)

(72) Inventors: Young-Tak Han, Daejeon (KR); Seoktae Kim, Daejeon (KR); Sang Ho Park, Daejeon (KR); Yongsoon Baek, Daejeon (KR); Jang Uk Shin, Daejeon (KR); Seok Jun Yun, Daejeon (KR); Seo Young Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 267 days.

(21) Appl. No.: 17/519,424

(22) Filed: Nov. 4, 2021

(65) Prior Publication Data

US 2022/0236618 A1 Jul. 28, 2022

(30) Foreign Application Priority Data

Jan. 27, 2021 (KR) .................. 10-2021-0011402

(51) Int. Cl.
*G02F 1/225* (2006.01)
*G02B 6/10* (2006.01)
*G02B 6/122* (2006.01)

(52) U.S. Cl.
CPC ........... *G02B 6/107* (2013.01); *G02B 6/1228* (2013.01); *G02F 1/2257* (2013.01)

(58) Field of Classification Search
CPC ..... G02B 6/107; G02B 6/1228; G02F 1/2257; G02F 1/212
USPC ......................................... 385/1–3
See application file for complete search history.

(56) References Cited

U.S. PATENT DOCUMENTS 9,678,278 B2   6/2017 Blaicher et al.
9,817,197 B2 * 11/2017 Kinghorn ............. H01L 31/125
10,162,112 B2  12/2018 Sutherland
10,162,133 B2  12/2018 Fish et al.
(Continued)

FOREIGN PATENT DOCUMENTS

EP     2940500 A1    11/2015
JP    2015-227992 A  12/2015
KR    10-1583736 B1   1/2016

OTHER PUBLICATIONS

"Hybrid photonic multi-chip integration enabled by 3D nano-printing" by Koos et al., IEEE Photonics Conference (IPC) Part II, pp. 1-2 (Year: 2017).*

(Continued)

*Primary Examiner* — Robert Tavlykaev
(74) *Attorney, Agent, or Firm* — Rabin & Berdo, P.C.

(57) ABSTRACT

Disclosed are a heterogeneously integrated optical modulator and a manufacturing method thereof. The modulator includes a substrate having a trench, an input waveguide disposed at one side of the trench, an output waveguide disposed at the other side of the trench, a first Mach-Zehnder interferometer including first branch waveguides disposed between the input waveguide and the output waveguide and a heater disposed on one of the first branch waveguides, and second Mach-Zehnder interferometers connected to each of the first branch waveguides.

12 Claims, 5 Drawing Sheets

(56) References Cited

U.S. PATENT DOCUMENTS

| | | | |
|---|---|---|---|
| 10,168,497 B2 * | 1/2019 | Merget | G02B 6/423 |
| 10,742,324 B1 * | 8/2020 | Padmaraju | H04B 10/541 |
| 10,761,283 B2 | 9/2020 | Je et al. | |
| 2012/0027336 A1 | 2/2012 | Park et al. | |
| 2012/0298401 A1 | 11/2012 | Je et al. | |
| 2013/0223788 A1 * | 8/2013 | Koos | G02B 6/30 |
| | | | 385/14 |
| 2015/0098676 A1 * | 4/2015 | Krasulick | G02B 6/12004 |
| | | | 438/27 |
| 2015/0309260 A1 * | 10/2015 | Blaicher | G02B 6/132 |
| | | | 29/426.2 |
| 2016/0299403 A1 | 10/2016 | Lee et al. | |
| 2018/0017748 A1 | 1/2018 | Shafiei et al. | |
| 2020/0284978 A1 * | 9/2020 | Kharas | G02B 6/136 |

OTHER PUBLICATIONS

"Photonic wire bonding: a novel concept for chipscale interconnects" by Lindenmann et al., Optics Express, vol. 20, No. 16, pp. 17667"Photonic wire bonding: a novel concept for chipscale interconnects" by Lindenmann et al., Optics Express, vol. 20, No. 16, pp. 17667-17677-17677 (Year: 2012).*

E. Yamada et al., "112-GB/s InP DP-QPSK Modulator Integrated with a Silica-PLC Polarization Multiplexing Circuit," OFC/NFOEC 2012, Mar. 4-8, 2012.

N. Kikuchi et al., "100-GB/s InP DP-IQ modulator for small-form-factor pluggable coherent transceivers," Proceedings of SPIE, vol. 9773, Optical Metro Networks and Short-Haul Systems VIII, Feb. 13, 2016.

* cited by examiner

HETEROGENEOUSLY INTEGRATED OPTICAL MODULATOR AND MANUFACTURING METHOD THEREOF

CROSS-REFERENCE TO RELATED APPLICATIONS

This U.S. non-provisional patent application claims priority under 35 U.S.C. § 119 of Korean Patent Application No. 10-2021-0011402, filed on Jan. 27, 2021, the entire contents of which are hereby incorporated by reference.

BACKGROUND

The present disclosure herein relates to an optical modulator and a manufacturing method thereof, and more particularly, to a heterogeneously integrated optical modulator and a manufacturing method thereof.

The importance and growth speed of a data center, which has rapidly grown due to spread of multimedia and cloud services, are expected to increase sharply as hyper-realistic services such as AR/VR and artificial intelligence services are generalized. Also, the outbreak of global infectious diseases such as COVID-19 causes increase in a data capacity of a high-quality image signal for online education, a remote medical examination and treatment, a video conference, and a seminar. For example, almost all optical transmission modules in the data center may be required to transmit ultra-high speed optical signals of about 100 Gbaud or higher to deal with the above-described data capacity in the future.

SUMMARY

The present disclosure provides a heterogeneously integrated optical modulator capable of overcoming a limit of a modulation bandwidth of about 50 GHz and a manufacturing method thereof.

An embodiment of the inventive concept provides a heterogeneously integrated optical modulator including: a substrate having a trench; an input waveguide disposed on the substrate of one side of the trench; an output waveguide disposed on the substrate of the other side of the trench; a first Mach-Zehnder interferometer including first branch waveguides disposed between the input waveguide and the output waveguide and a heater disposed on one of the first branch waveguides; and second Mach-Zehnder interferometers connected to each of the first branch waveguides. Here, each of the second Mach-Zehnder interferometers includes: second branch waveguides disposed on the substrate of both sides of the trench; a modulation cell including a control block disposed in the trench and modulation waveguides disposed on the control block and disposed between the second branch waveguides; photonic wires connecting the modulation waveguides to the second branch waveguides; and a polymer clad covering the second branch waveguides and the modulation waveguides and covering the photonic wires.

In an embodiment, each of the first branch waveguides and the second branch waveguides may include a IV semiconductor material, and each of the modulation waveguides may include a III-V semiconductor material.

In an embodiment, each of the first branch waveguides and the second branch waveguides may include a silicon nitride, and each of the modulation waveguides may include indium phosphide.

In an embodiment, each of the second branch waveguides may be thicker and wider than each of the modulation waveguides.

In an embodiment, each of the photonic wires may include: a first mode converter connected to the second branch waveguides; a second mode converter connected to the modulation waveguides; and a core connecting the first mode converter to the second mode converter.

In an embodiment, the core may be thicker or thinner than each of the second branch waveguides and thicker than each of the modulation waveguide.

In an embodiment, the photonic wires may include a polymer having a refractive index of about 1.48 to about 1.55 greater than that of the polymer clad.

In an embodiment, the first branch waveguides may include: first input branch waveguides connected to the input waveguide; and first output branch waveguides connected to the output waveguide.

In an embodiment, the second branch waveguides may include: second input branch waveguides branched from each of the first input branch waveguides; and second output branch waveguides coupled to each of the first output branch waveguides.

In an embodiment, the control block may have a hexahedral shape.

In an embodiment of the inventive concept, a heterogeneously integrated optical modulator includes: a substrate having a trench; a dielectric clad layer disposed on the substrate of both sides of the trench; an input waveguide disposed on the dielectric clad layer of one side of the trench; first input branch waveguides branched from the input waveguide; second input branch waveguides branched from each of the first input branch waveguides; an output waveguide disposed on the dielectric clad layer of the other side of the trench; first output branch waveguides coupled to the output waveguide; second output branch waveguides coupled to each of the first output branch waveguides; a heater disposed on one of the first output branch waveguides; modulation cells disposed in the trench and including modulation waveguides connected between the second input branch waveguides and the second output branch waveguides; photonic wires connecting the modulation waveguides to the second input branch waveguides and the second output branch waveguides; and a polymer clad covering the second input branch waveguides and the modulation waveguides, covering the second output branch waveguides and the modulation waveguides, and covering the photonic wires.

In an embodiment, each of the modulation waveguides may further include the substrate disposed in the trench and a control block disposed between the modulation waveguides.

In an embodiment, each of the control block and the modulation waveguides may include a III-V semiconductor material.

In an embodiment, each of the input waveguide, the output waveguide, the first and second input branch waveguides, and the first and second output branch waveguides may include a silicon nitride, and each of the control block and the modulation waveguides may include indium phosphide.

In an embodiment, each of the photonic wires may include: a first mode converter connected to the second input branch waveguides and the second output branch waveguides; a second mode converter connected to the modulation waveguides; and a core connecting the first mode converter to the second mode converter, and each of the first and second mode converters may include a tapered spot-size converter.

In an embodiment of the inventive concept, a method for manufacturing a heterogeneously integrated optical modulator includes: forming a dielectric clad layer on a substrate; forming an input waveguide, an output waveguide, first branch waveguides, and second branch waveguides on the dielectric clad layer; forming a heater on one of the first branch waveguides; forming a trench by etching a portion of the second branch waveguides, the dielectric clad layer, and the substrate; mounting modulation cells including modulation waveguides connected to the second branch waveguides of both sides of the trench into the trench; forming photonic wires connecting the modulation waveguides to the second branch waveguides; and forming a polymer clad over the photonic wires disposed between the second branch waveguides and the modulation waveguides.

In an embodiment, the photonic wires may include a polymer formed by a 3D nano-printing method.

In an embodiment, the polymer clad may be formed by a dropping and local-coating method.

In an embodiment, the polymer clad may be formed in the trench.

In an embodiment, the modulation cells may be fixed onto a bottom of the trench by silver paste, solder paste, and solder.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
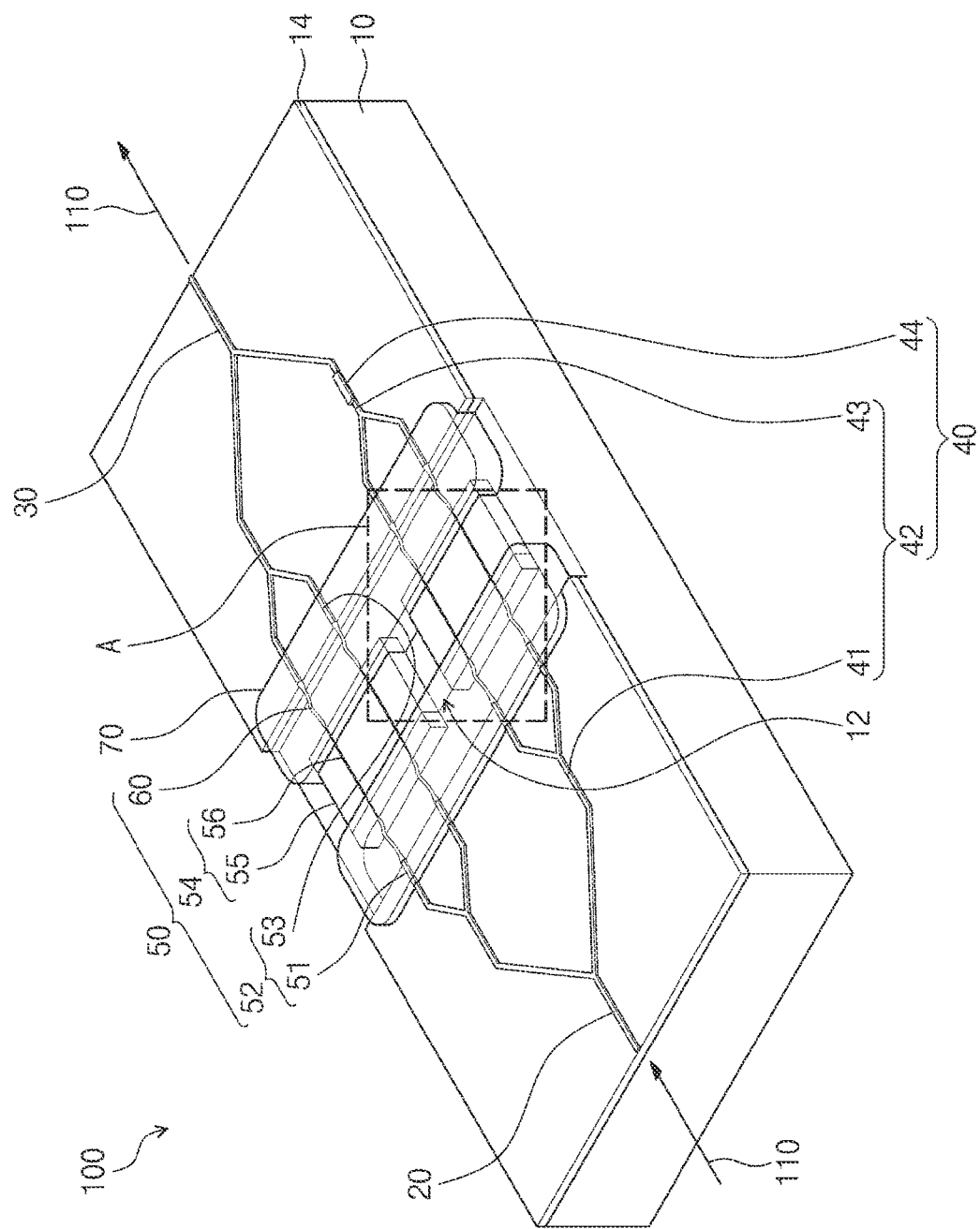
FIGS. 1 to 3 are a perspective view, a plan view, and a side view illustrating an example of a heterogeneously integrated optical modulator according to an embodiment of the inventive concept.

Hereinafter, exemplary embodiments of the present invention will be described in detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present disclosure is only defined by scopes of claims. Like reference numerals refer to like elements throughout.

In the specification, the technical terms are used only for explaining a specific exemplary embodiment while not limiting the present invention. In the specification, the terms of a singular form may include plural forms unless referred to the contrary. The meaning of 'comprises' and/or 'comprising' specifies a component, a step, an operation and/or an element does not exclude other components, steps, operations and/or elements. Also, it will be understood that each of an interferometer, a waveguide, a core, and a refractive index used in this specification has a meaning generally used in the optical field. Since preferred embodiments are provided below, the order of the reference numerals given in the description is not limited thereto.

Figure 2:
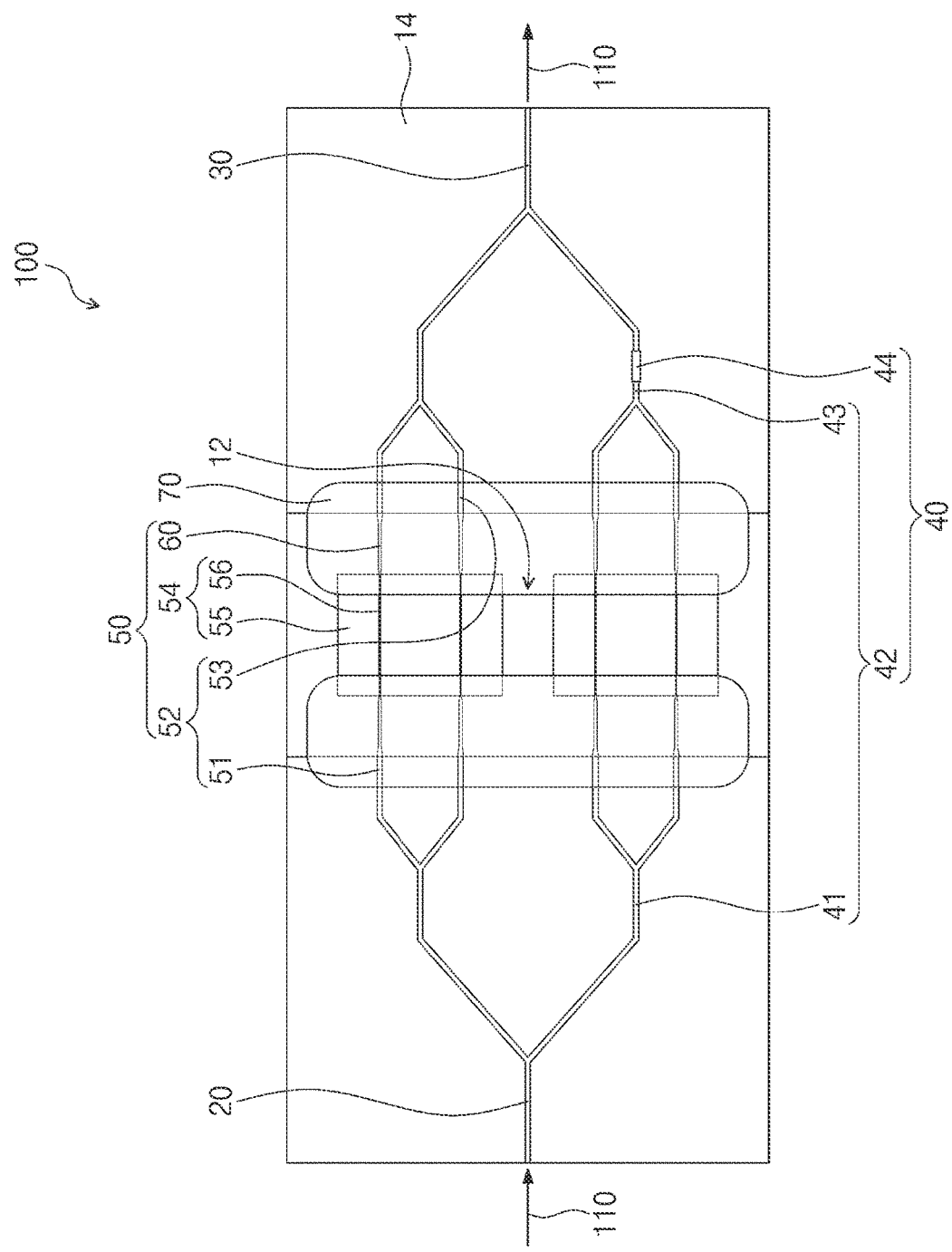
Figure 3:
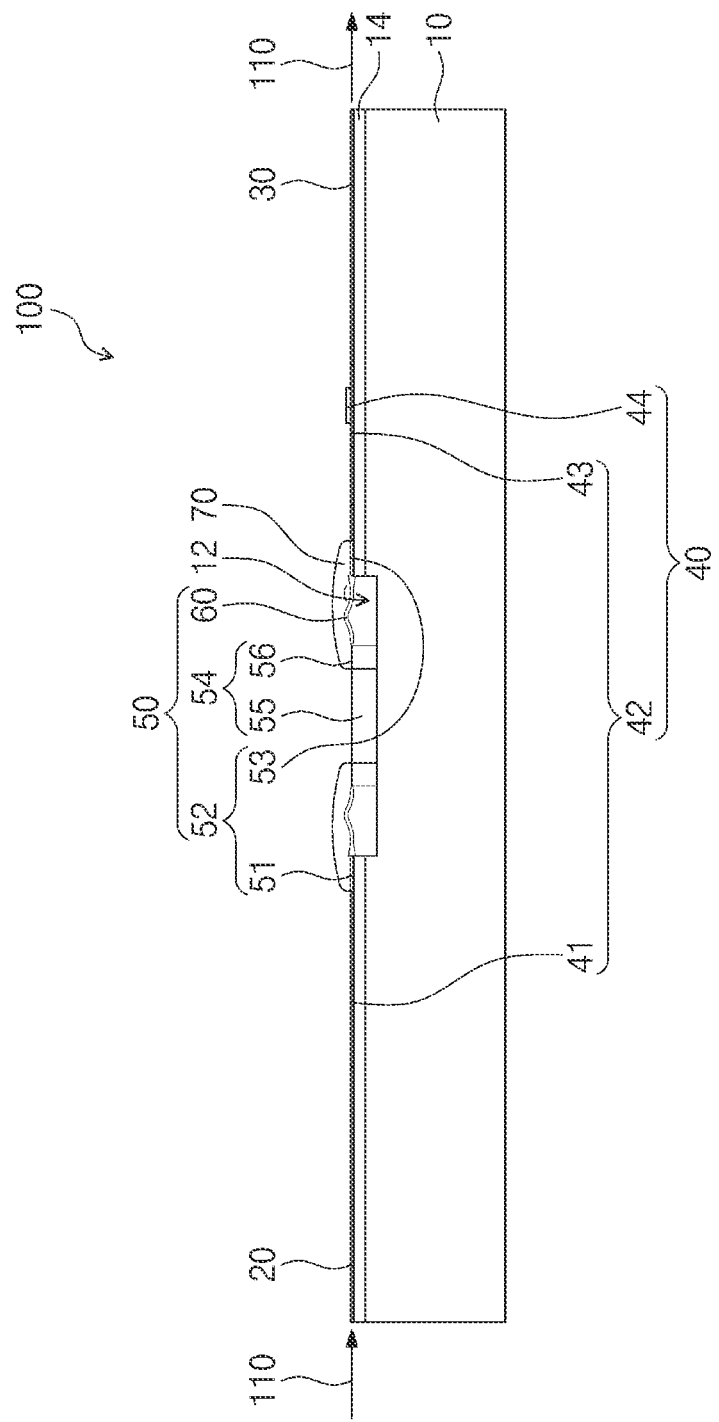

FIGS. 1 to 3 are views illustrating an example of a heterogeneously integrated optical modulator 100 according to an embodiment of the inventive concept.

Referring to FIGS. 1 to 3, the heterogeneously integrated optical modulator 100 according to an embodiment of the inventive concept may be a SiN/InP heterogeneously integrated In-phase and Quadrature phase (IQ) optical modulator. For example, the heterogeneously integrated optical modulator 100 according to an embodiment of the inventive concept may include a substrate 10, an input waveguide 20, an output waveguide 30, a first Mach-Zehnder interferometer 40, and second Mach-Zehnder interferometers 50.

The substrate 10 may provide a flat surface to the input waveguide 20, the output waveguide 30, the first Mach-Zehnder interferometer 40 and the second Mach-Zehnder interferometers 50. For example, the substrate 10 may include a silicon substrate of a IV semiconductor. Alternatively, the substrate 10 may include Quartz or Alkali-based glass of a silicon oxide ($SiO_2$). However, the embodiment of the inventive concept is not limited thereto. For example, the substrate 10 may have a trench 12. The trench 12 may be disposed on a center of the substrate 10. The trench 12 may have a depth of about 10 μm to about 150 μm. The depth of trench 12 may correspond to a thickness of modulation cells 54. A dielectric clad layer 14 may be disposed on the substrate 10 of both sides of the trench 12. The dielectric clad layer 14 may include silicon nitride (SiN) having a low refractive index. Alternatively, the dielectric clad layer 14 may include a silicon oxide ($SiO_2$). However, the embodiment of the inventive concept is not limited thereto.

The input waveguide 20 may be disposed on the substrate 10 of one side of the trench 12. The input waveguide 20 may be disposed on the dielectric clad layer 14. The input waveguide 20 may be a rib waveguide or a ridge waveguide. For example, the input waveguide 20 may include silicon nitride (SiN) having a high refractive index. Alternatively, the input waveguide 20 may include crystalline silicon. However, the embodiment of the inventive concept is not limited thereto. The input waveguide 20 may receive light 110 from a light source and provide the light 110 to the first Mach-Zehnder interferometer 40, the second Mach-Zehnder interferometers 50 and the output waveguide 30.

The output waveguide 30 may be disposed on the substrate 10 of the other side of the trench 12. The output waveguide 30 may be disposed on the dielectric clad layer 14. The output waveguide 30 may be a rib waveguide or a ridge waveguide. The output waveguide 30 may include the same material as the input waveguide 20. The output waveguide 30 may include silicon nitride (SiN). Alternatively, the output waveguide 30 may include crystalline silicon. However, the embodiment of the inventive concept is not limited thereto. The output waveguide 30 may receive the light 110 from the first Mach-Zehnder interferometer 40 and the second Mach-Zehnder interferometers 50 and provide the light to a light reception device.

The first Mach-Zehnder interferometer 40 may be disposed between the input waveguide 20 and the output waveguide 30. The first Mach-Zehnder interferometer 40 may generate an optical signal having a modulated light intensity and phase by using the light 110. For example, the first Mach-Zehnder interferometer 40 may include first branch waveguides 42 and a heater 44.

The first branch waveguides 42 may be disposed on the dielectric clad layer 14 of the both sides of the trench 12. The first branch waveguides 42 may be a rib waveguide or a ridge waveguide. The first branch waveguides 42 may be connected to the input waveguide 20 on the dielectric clad layer 14 of the one side of the trench 12 and connected to the output waveguide 30 on the dielectric clad layer 14 of the other side of the trench 12. Each of the first branch waveguides 42 may include the same material as each of the input waveguide 20 and the output waveguide 30. The first branch waveguides 42 may include a silicon nitride (SiN). The first branch waveguides 42 of the silicon nitride (SiN) may reduce a light propagation loss to be equal to or less than about 0.1 dB/cm. Alternatively, the first branch waveguides 42 may include amorphous silicon. However, the embodiment of the inventive concept is not limited thereto. The first branch waveguides 42 may transmit the light 110 between the input waveguide 20 and the output waveguide 30. For example, the first branch waveguides 42 may include first input branch waveguides 41 and first output branch waveguides 43.

The first input branch waveguides 41 may be connected to the input waveguide 20 on the dielectric clad layer 14 of the one side of the trench 12. The first input branch waveguides 41 may be branched from the input waveguide 20. The input waveguide 20 and the first input branch waveguides 41 may have a Y-branch splitter structure. The first input branch waveguides 41 may split and/or divide the light 110 from the input waveguide 20.

The first output branch waveguides 43 may be connected to the output waveguide 30 on the dielectric clad layer 14 of the other side of the trench 12. The first output branch waveguides 43 may be branched from the output waveguide 30. The output waveguide 30 and the first output branch waveguides 43 may have the Y-branch splitter structure. The first branch waveguides 42 may provide the light 110 into the output waveguide 30.

The heater 44 may be disposed on one of the first output branch waveguides 43. The heater 44 may heat the first output branch waveguide 43 to change a phase of light traveling along the first output branch waveguide 43 by 90°. The heater 44 may function as a phase shifter of the light 110. The heater 44 may heat the first output branch waveguide 43 to change a refractive index thereof. The heater 44 may delay the phase of the traveling light by using the refractive index change of the first output branch waveguide 43. The light from the plurality of first output branch waveguide 43 may be provided to the output waveguide 30. For example, the heater 44 may include a Nickel-Chromium alloy. Although not shown, an upper clad layer may be disposed between the heater 44 and the first output branch waveguide 43.

The second Mach-Zehnder interferometers 50 may be connected into the first Mach-Zehnder interferometer 40. The second Mach-Zehnder interferometers 50 may be Mach-Zehnder interferometers nested in the first Mach-Zehnder interferometer 40. Each of the second Mach-Zehnder interferometers 50 may be connected between one pair of the first input branch waveguide 41 and the first output branch waveguide 43, which face each other.

For example, the second Mach-Zehnder interferometers 50 may include second branch waveguides 52, the modulation cells 54, photonic wires 60, and a polymer clad 70.

The second branch waveguides 52 may be disposed on the dielectric clad layer 14 of the both sides of the trench 12. The second branch waveguides 52 may be a rib waveguide or a ridge waveguide. The second branch waveguides 52 may be connected to the first input branch waveguide 41 and the first output branch waveguide 43. The second branch waveguides 52 may include the same material as the first branch waveguides 42. The second branch waveguides 52 may include silicon nitride (SiN). Alternatively, the second branch waveguides 52 may include amorphous silicon. However, the embodiment of the inventive concept is not limited thereto. For example, the second branch waveguides 52 may include second input branch waveguides 51 and second output branch waveguides 53.

The second input branch waveguides 51 may be connected to the first input branch waveguides 41 at the one side of the trench 12. The second input branch waveguides 51 may be branched from the first input branch waveguide 41. The first input branch waveguide 41 and the second input branch waveguides 51 may have the Y-branch splitter structure. The second input branch waveguides 51 may split and/or divide the light 110 from the first input branch waveguide 41.

The second output branch waveguides 53 may be connected to the first output branch waveguides 43 at the other side of the trench 12. The second output branch waveguides 53 may be coupled to the first output branch waveguide 43. The first output branch waveguide 43 and the second output branch waveguides 53 may have the Y-branch splitter structure. The second output branch waveguides 53 may provide the light 110 into the first output branch waveguide 43. When the modulation cells modulate the light 110, the light 110 may be interfered in the first output branch waveguide 43.

Referring to FIGS. 1 to 3 again, the modulation cells 54 may be disposed in the trench 12. The modulation cells 54 may be disposed between the second input branch waveguides 51 and the second output branch waveguides 53. The modulation cells 54 may modulate the light 110. For example, the light 110 may have a frequency of about 50 GHz or higher. For example, each of the modulation cells 54 may include a control block 55 and modulation waveguides 56.

The control block 55 may be disposed in the trench 12. The control block 55 may have a cuboid shape. The control block 55 may be fixed on a bottom of the trench 12. For example, the control block 55 may be fixed and/or integrated on the bottom of the trench 12 by silver paste, solder paste, and solder. For example, a top surface of the control block 55 and a top surface of the dielectric clad layer 14 may provide a coplanar surface. The control block 55 may provide an electric field to the modulation waveguides 56 to control a phase and/or an amplitude of the light 110 in the modulation waveguides 56. Although not shown, the control block 55 may include a plurality of electrodes disposed adjacent to the modulation waveguides 56. However, the embodiment of the inventive concept is not limited thereto. For example, the control block 55 may include a III-V semiconductor of indium phosphide (InP) and/or gallium arsenide (GaAs).

The modulation waveguides 56 may be disposed on the control block 55. The modulation waveguides 56 may be a rib waveguide or a ridge waveguide. The modulation waveguides 56 may be disposed between the second input branch waveguides 51 and the second output branch waveguides 53. The modulation waveguides 56 may be arranged in the same direction as the second input branch waveguides 51 and the second output branch waveguides 53. Each of the modulation waveguides 56 may have a thickness less than that of each of the second input branch waveguides 51 and the second output branch waveguides 53. The modulation waveguides 56 may transmit the light 110 between the second input branch waveguides 51 and the second output branch waveguides 53. The control block 55 may modulate the light 110 in the modulation waveguides 56 at a high speed.

For example, the light 110 may have a frequency of about 50 GHz or higher. Thus, the heterogeneously integrated optical modulator 100 according to an embodiment of the inventive concept may have a modulation bandwidth of about 50 GHz or higher by using the modulation cell 54 of a III-V semiconductor, which is mounted in the trench 12 of the silicon substrate 10. For example, the modulation waveguide 56 may include a III-V semiconductor of indium phosphide (InP).

Figure 4:
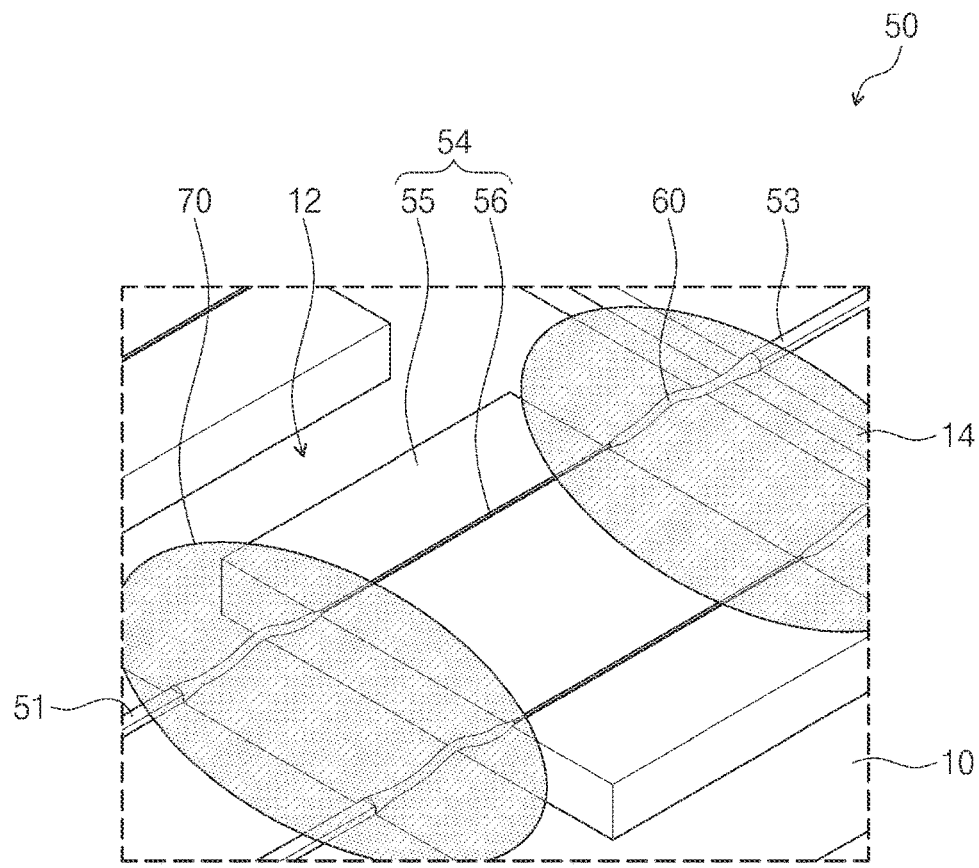
FIG. 4 is a perspective view illustrating a connected portion of a photonic wire and a modulation cell of a second Mach-Zehnder interferometer in a portion A of FIG. 1.

FIG. 4 is a view illustrating a connected state of a photonic wire and the modulation cell of the second Mach-Zehnder interferometer 50 in a portion A of FIG. 1.

Referring to FIGS. 1 to 4, the photonic wires 60 of the second Mach-Zehnder interferometers 50 may connect the modulation waveguides 56 to the second input branch waveguides 51 and the second output branch waveguides 53. When each of the modulation waveguides 56 has a thickness less than that of each of the second input branch waveguides 51 and the second output branch waveguides 53, each of the photonic wires 60 may have a thickness thicker than that of each of the modulation waveguides 56 and thicker or thinner than that of each of the second input branch waveguides 51 and the second output branch waveguides 53. The photonic wires 60 may transmit the light 110 between the second input branch waveguides 51 and the modulation waveguides 56 in a state of minimizing an optical coupling loss of the light 110. Also, the photonic wires 60 may transmit the light 110 between the second output branch waveguides 53 and the modulation waveguides 56 in the state of minimizing the optical coupling loss of the light 110 (here, an optical mode converter allows an optical mode to be adiabatically changing, i.e., the optical coupling loss to be minimized, by slowly changing a size of the optical mode). For example, the photonic wires 60 may include a polymer having a refractive index of about 1.48 to about 1.55.

The polymer clads 70 may be disposed on the photonic wires 60. The polymer clads 70 may be disposed in the trench 12. The polymer clads 70 may be disposed on a portion of the control block 55 adjacent to the trench 12, the dielectric clad layer 14, the second input branch waveguides 51, and the second output branch waveguides 53. The polymer clads 70 may have a refractive index less than that of the photonic wires 60. The light 110 may be transmitted through the photonic wires 60 in the polymer clads 70.

Figure 5:
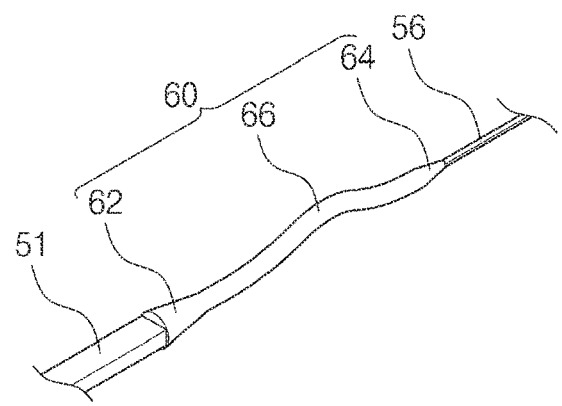
FIG. 5 is a perspective view illustrating an example of the photonic wire of FIG. 4.

FIG. 5 is a view illustrating an example of the photonic wire 60 of FIG. 4.

Referring to FIG. 5, the photonic wire 60 may include a first mode converter 62, a second mode converter 64, and a core 66.

The first mode converter 62 may be connected to the second input branch waveguide 51. Although not shown, the first mode converter 62 may be connected to the second output branch waveguide 53. The first mode converter 62 may include a tapered spot-size converter. The first mode converter 62 may have a cross-section corresponding to a mode field diameter (MFD) of each of the second input branch waveguide 51 and the second output branch waveguide 53. For example, the first mode converter 62 may have a cross-section greater than that of the second input branch waveguide 51. When the second input branch waveguide 51 has a rectangular cross-section, the first mode converter 62 may have an elliptical cross-section having a major axis greater than a diagonal line of the second input branch waveguide 51. Alternatively, the first mode converter 62 may have a rectangular cross-section having a line greater than that of the second input branch waveguide 51. Although not shown, the first mode converter 62 may have a cross-section greater than that of the second output branch waveguide 53.

The second mode converter 64 may be connected to the modulation waveguide 56. The second mode converter 64 may be less in size than the first mode converter 62. The second mode converter 64 may have the same shape as the first mode converter 62. The second mode converter 64 may include a tapered spot-size converter. When the modulation waveguide 56 has a rectangular cross-section, the second mode converter 64 may have an elliptical cross-section having a major axis greater than a diagonal line of the modulation waveguide 56. The second mode converter 64 may have a rectangular cross-section having a line greater than that of the modulation waveguide 56. The first mode converter 62, the second mode converter 64, and the core 66 may reduce an optical coupling loss of the light 110 between the second input branch waveguides 51 and the second output branch waveguides 53 to be equal to or less than about 1 dB.

The core 66 may be connected between the first mode converter 62 and the second mode converter 64. The core 66 may have a circular or rectangular cross-section. The core 66 may have a constant diameter. For example, the core 66 may be thinner than each of the second input branch waveguide 51 and the second output branch waveguide 53 and thicker than the modulation waveguide 56. The core 66 may transmit the light 110 between the first mode converter 62 and the second mode converter 64.

A method for manufacturing the above-described heterogeneously integrated optical modulator 100 according to an embodiment of the inventive concept will be described as follows.

Figure 6:
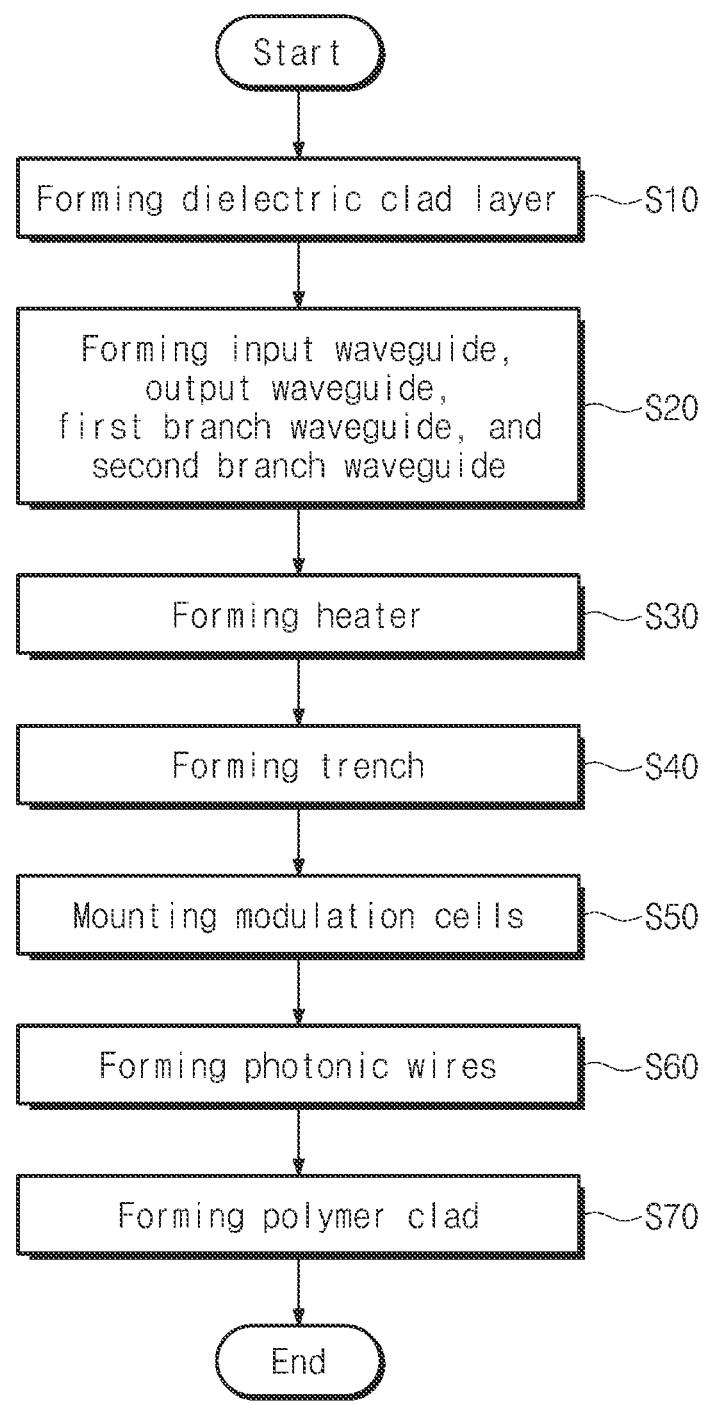
FIG. 6 is a flowchart showing a method for manufacturing a heterogeneously integrated optical modulator according to an embodiment of the inventive concept.

FIG. 6 is a flowchart showing the method for manufacturing the heterogeneously integrated optical modulator 100.

Referring to FIGS. 1 to 3 and 6, the dielectric clad layer 14 is formed on the substrate 10 in a process S10. The substrate 10 may include a silicon substrate. Alternatively, the substrate 10 may include silicon oxide ($SiO_2$). However, the embodiment of the inventive concept is not limited thereto. The dielectric clad layer 14 may include silicon nitride (SiN) having a low refractive index, which is formed through a chemical vapor deposition process.

Thereafter, the input waveguide 20, the output waveguide 30, the first branch waveguides 42, the and second branch waveguides 52 are formed in a process S20. Each of the input waveguide 20, the output waveguide 30, the first branch waveguides 42, and the second branch waveguides 52 may include a silicon nitride (SiN). Each of the input waveguide 20, the output waveguide 30, the first branch waveguides 42, and the second branch waveguides 52 may be a rib waveguide or a ridge waveguide. Each of the input waveguide 20, the output waveguide 30, the first branch waveguides 42, and the second branch waveguides 52 may include a silicon nitride (SiN) having a high refractive index, which is formed by a photolithography process and an etching process. The first branch waveguides 42 may be branched from the input waveguide 20 and coupled to the output waveguide 30. For example, each of the first branch waveguides 42 may include the first input branch waveguide 41 and the first output branch waveguide 43. The first branch waveguide 42 may be connected to the input waveguide 20, and the first output branch waveguide 43 may be connected to the output waveguide 30. The second branch waveguides 52 may be connected between the first input branch waveguide 41 and the first output branch waveguide 43.

Thereafter, the heater 44 is formed on one of the first output branch waveguides 43 in a process S30. The heater 44 may include a Nickel-Chromium alloy formed through an e-beam or sputtering deposition process, a photolithography process, and an etching process.

Thereafter, the trench 12 is formed by etching a portion of the second branch waveguides 52, the dielectric clad layer 14, and the substrate 10 in a process S40. The process of etching the second branch waveguides 52, the dielectric clad layer 14, and the substrate 10 may include inductive coupled plasma (ICP) or deep reactive ion etching (DRIE). The trench 12 may divide the second branch waveguides 52 in a longitudinal direction thereof to form the second input branch waveguides 51 and the second output branch waveguides 53. The trench 12 may expose a bottom of the substrate 10.

Thereafter, the modulation cells 54 are mounted into the trench 12 in a process S50. The modulation cells 54 may be fixed on the bottom of the substrate 10 in the trench 12 by using silver paste, solder paste, and solder. Each of the modulation cells 54 may include the control block 55 and the modulation waveguides 56. For example, each of the control block 55 and the modulation waveguide 56 may include a III-V semiconductor of indium phosphide (InP). The control block 55 may modulate light 110 at a frequency of about 50 GHz or higher by applying an electric field to the modulation waveguides 56. The modulation waveguides 56 may be arranged between the second input branch waveguides 51 and the second output branch waveguides 53.

Also, the photonic wires 60 are formed in a process S60. The photonic wires 60 may connect the modulation waveguides 56 to the second input branch waveguides 51 and the second output branch waveguides 53. The photonic wires 60 may include a polymer formed by a 3D nano-printing method. The photonic wires 60 may have a refractive index of about 1.48 to about 1.55.

Finally, the polymer clads 70 are formed over the photonic wires 60. The polymer clads 70 may be formed by a dropping and local-coating method. The polymer clads 70 may be formed in the trench 12. The polymer clads 70 may have a refractive index less than that of the photonic wires 60.

As described above, the heterogeneously integrated optical modulator according to the embodiment of the inventive concept may obtain the modulation bandwidth of about 50 GHz or higher by using the modulation cell of the III-V semiconductor, which is mounted into the trench of the IV semiconductor substrate.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A heterogeneously integrated optical modulator comprising:
   a substrate having a trench;
   an input waveguide disposed on the substrate on one side of the trench;
   an output waveguide disposed on the substrate on another side of the trench;
   a first Mach-Zehnder interferometer including first branch waveguides disposed between the input waveguide and the output waveguide and a heater disposed on one of the first branch waveguides, the first branch waveguides including first input branch waveguides connected to the input waveguide and first output branch waveguides connected to the output waveguide; and
   second Mach-Zehnder interferometers connected to each of the first branch waveguides,
   wherein each of the second Mach-Zehnder interferometers includes:
   second branch waveguides disposed on the substrate on both sides of the trench, the second branch waveguides including second input branch waveguides connected to the first input branch waveguides and second output branch waveguides connected to the first output branch waveguides;
   modulation cells including a control block disposed in the trench and modulation waveguides disposed on the control block and disposed between the second branch waveguides;
   photonic wires connecting the modulation waveguides to the second branch waveguides; and
   a polymer clad covering the second branch waveguides, the modulation waveguides, and the photonic wires,
   wherein the modulation waveguides comprise:
   a first modulation waveguide extending in a first direction and disposed on one side of the control block, and
   a second modulation waveguide extending in the first direction and disposed on another side of the control block,
   wherein each of the first modulation waveguide and the second modulation waveguide is narrower than the second input branch waveguides and the second output branch waveguides, and
   wherein the photonic wires comprise:
   first photonic wires connecting the second input branch waveguides to the first modulation waveguide and the second modulation waveguide and becoming narrower in the first direction, and
   second photonic wires connecting the first modulation waveguide and the second modulation waveguide to the second output branch waveguides and becoming wider in the first direction,
   wherein the modulation cells comprise:
   a first modulation cell disposed on one side of the trench, and
   a second modulation cell disposed on another side of the trench in a second direction crossing the first direction,
   wherein the polymer clad comprises:
   a first polymer clad covering the first photonic wires and extending in the second direction, and
   a second polymer clad covering the second photonic wires and extending in the second direction, and
   wherein the first polymer clad and second polymer clad expose center portions of the first and second modulation cells, a bottom of the trench between the first and second modulation cells, and side surfaces of the first and second modulation cells in the second direction to increase heat dissipation of the first and second modulation cells.

2. The heterogeneously integrated optical modulator of claim 1, wherein each of the first branch waveguides and the second branch waveguides includes a IV semiconductor material, and
each of the modulation waveguides includes a III-V semiconductor material.

3. The heterogeneously integrated optical modulator of claim 2, wherein each of the first branch waveguides and the second branch waveguides includes silicon nitride, and
each of the modulation waveguides includes indium phosphide.

4. The heterogeneously integrated optical modulator of claim 1, wherein each of the photonic wires comprises:
a first mode converter connected to the second branch waveguides;
a second mode converter connected to the modulation waveguides; and
a core connecting the first mode converter to the second mode converter.

5. The heterogeneously integrated optical modulator of claim 4, wherein the core is thicker or thinner than each of the second branch waveguides and thicker than each of the modulation waveguides.

6. The heterogeneously integrated optical modulator of claim 1, wherein the photonic wires include a polymer having a refractive index of about 1.48 to about 1.55 and greater than that of the polymer clad.

7. The heterogeneously integrated optical modulator of claim 1, wherein the control block has a hexahedral shape.

8. A heterogeneously integrated optical modulator comprising:
a substrate having a trench;
a dielectric clad layer disposed on the substrate on sides of the trench;
an input waveguide disposed on the dielectric clad layer on one side of the trench;
first input branch waveguides branched from the input waveguide;
second input branch waveguides branched from each of the first input branch waveguides;
an output waveguide disposed on the dielectric clad layer of on another side of the trench;
first output branch waveguides coupled to the output waveguide;
second output branch waveguides coupled to each of the first output branch waveguides;
a heater disposed on one of the first output branch waveguides;
modulation cells including a control block disposed in the trench and modulation waveguides disposed on the control block, the modulation waveguides connected between the second input branch waveguides and the second output branch waveguides;
photonic wires connecting the modulation waveguides to the second input branch waveguides and the second output branch waveguides; and
a polymer clad covering the second input branch waveguides and the modulation waveguides, covering the second output branch waveguides and the modulation waveguides, and covering the photonic wires,
wherein the modulation waveguides comprise:
a first modulation waveguide extending in a first direction and disposed on one side of the control block, and
a second modulation waveguide extending in the first direction and disposed on another side of the control block,
wherein each of the first modulation waveguide and the second modulation waveguide is narrower than the second input branch waveguides and the second output branch waveguides, and
wherein the photonic wires comprise:
first photonic wires connecting the second input branch waveguides to the first modulation waveguide and the second modulation waveguide and becoming narrower in the first direction, and
second photonic wires connecting the first modulation waveguide and the second modulation waveguide to the second output branch waveguides and becoming wider in the first direction,
wherein the modulation cells comprise:
a first modulation cell disposed on one side of the trench, and
a second modulation cell disposed on another side of the trench in a second direction crossing the first direction,
wherein the polymer clad comprises:
a first polymer clad covering the first photonic wires and extending in the second direction, and
a second polymer clad covering the second photonic wires and extending in the second direction, and
wherein the first polymer clad and second polymer clad expose center portions of the first and second modulation cells, a bottom of the trench between the first and second modulation cells, and side surfaces of the first and second modulation cells in the second direction to increase heat dissipation of the first and second modulation cells.

9. The heterogeneously integrated optical modulator of claim 8, wherein each of the first and second modulation cells further comprises a control block disposed between the modulation waveguides.

10. The heterogeneously integrated optical modulator of claim 9, wherein each of the control block and the modulation waveguides includes a III-V semiconductor material.

11. The heterogeneously integrated optical modulator of claim 10, wherein each of the input waveguide, the output waveguide, the first and second input branch waveguides, and the first and second output branch waveguides includes silicon nitride, and
each of the control block and the modulation waveguides includes indium phosphide.

12. The heterogeneously integrated optical modulator of claim 8, wherein each of the photonic wires comprises:
a first mode converter connected to the second input branch waveguides and the second output branch waveguides;
a second mode converter connected to the modulation waveguides; and
a core connecting the first mode converter to the second mode converter,
wherein each of the first and second mode converters includes a tapered spot-size converter.

* * * * *